United States Patent
Hosp et al.

(10) Patent No.: US 10,740,757 B2
(45) Date of Patent: Aug. 11, 2020

(54) METHOD AND SYSTEM FOR SECURED MERCHANT VERIFICATION

(71) Applicant: Mastercard International Incorporated, Purchase, NY (US)

(72) Inventors: Adam Kenneth Hosp, Lake St. Louis, MO (US); Oran Cummins, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 525 days.

(21) Appl. No.: 15/397,926

(22) Filed: Jan. 4, 2017

(65) Prior Publication Data

US 2018/0189785 A1    Jul. 5, 2018

(51) Int. Cl.
| | |
|---|---|
| *G06Q 40/04* | (2012.01) |
| *G06Q 20/40* | (2012.01) |
| *G06Q 20/10* | (2012.01) |
| *G06F 16/22* | (2019.01) |
| *G06Q 20/20* | (2012.01) |
| *G06F 21/42* | (2013.01) |
| *G06Q 20/42* | (2012.01) |
| *G06F 21/40* | (2013.01) |

(52) U.S. Cl.
CPC .......... *G06Q 20/401* (2013.01); *G06F 16/22* (2019.01); *G06F 21/40* (2013.01); *G06F 21/42* (2013.01); *G06Q 20/102* (2013.01); *G06Q 20/202* (2013.01); *G06Q 20/425* (2013.01)

(58) Field of Classification Search
None
See application file for complete search history.

(56) References Cited

U.S. PATENT DOCUMENTS

| | | | | |
|---|---|---|---|---|
| 4,093,276 A | * | 6/1978 | Debe | B42D 25/29 283/117 |
| 6,636,833 B1 | | 10/2003 | Flitcroft et al. | |
| | | | (Continued) | |

FOREIGN PATENT DOCUMENTS

CA        2 610 649 A1    5/2008

OTHER PUBLICATIONS

Notification of Transmittal of the International Search Report and the Written Opinion of the International Searching Authority (Forms PCT/ISA/220, PCT/ISA/210 and PCT/ISA237) dated Jan. 31, 2018, by the European Patent Office in corresponding International Application No. PCT/US2017/064159. (13 pages).

*Primary Examiner* — William J Jacob
(74) *Attorney, Agent, or Firm* — Buchanan Ingersoll & Rooney PC (57) ABSTRACT

A method for verifying a transacting entity includes: receiving a verification request including an entity identifier; transmitting a transaction amount; receiving a transaction message for a payment transaction including a controlled payment number, the transaction amount, and the entity identifier; transmitting at least two refund messages including the controlled payment number and a refund amount, where a total of the refund amount included in each refund message equals the transaction amount; receiving a verification message including the entity identifier and two or more return amounts; and verifying that the two or more return amounts correspond to the refund amounts included in the two or more refund messages.

16 Claims, 5 Drawing Sheets

(56) References Cited

U.S. PATENT DOCUMENTS

| | | | |
|---|---|---|---|
| 6,895,391 B1* | 5/2005 | Kausik | G06F 21/34 705/50 |
| 6,941,286 B1* | 9/2005 | Foth | G07B 17/00435 705/403 |
| 7,096,494 B1* | 8/2006 | Chen | G06Q 20/04 380/259 |
| 7,107,239 B2* | 9/2006 | Graff | G06Q 30/06 705/31 |
| 7,136,835 B1 | 11/2006 | Flitcroft et al. | |
| 7,359,880 B2 | 4/2008 | Abel et al. | |
| 7,567,934 B2 | 7/2009 | Flitcroft et al. | |
| 7,571,142 B1 | 8/2009 | Flitcroft et al. | |
| 7,593,896 B1 | 9/2009 | Flitcroft et al. | |
| 7,865,426 B2* | 1/2011 | Volpert | G06Q 40/00 705/35 |
| 7,895,122 B2 | 2/2011 | Flitcroft et al. | |
| 8,229,854 B2 | 7/2012 | Stephen et al. | |
| 8,321,315 B2 | 11/2012 | Abel et al. | |
| 8,510,218 B2 | 8/2013 | Abel et al. | |
| 8,527,416 B2 | 9/2013 | Flitcroft et al. | |
| 8,639,623 B2 | 1/2014 | Kavanagh et al. | |
| 8,756,150 B2 | 6/2014 | Flitcroft et al. | |
| 2002/0046154 A1* | 4/2002 | Pritchard | G06Q 40/04 705/37 |
| 2002/0077837 A1* | 6/2002 | Krueger | G06Q 20/02 705/39 |
| 2002/0161684 A1* | 10/2002 | Whitworth | G06Q 40/04 705/36 R |
| 2003/0191945 A1* | 10/2003 | Keech | G06Q 20/02 713/182 |
| 2004/0230507 A1* | 11/2004 | Davidovitch | G06Q 40/00 705/35 |
| 2005/0035847 A1* | 2/2005 | Bonalle | G06Q 20/00 340/5.61 |
| 2008/0065532 A1* | 3/2008 | De La Motte | G06Q 20/10 705/39 |
| 2009/0063345 A1* | 3/2009 | Erikson | G06Q 20/10 705/44 |
| 2009/0187509 A1* | 7/2009 | McNamee | G06Q 30/00 705/80 |
| 2012/0016766 A1 | 1/2012 | Raizada et al. | |
| 2012/0239579 A1* | 9/2012 | Wolfs | G06Q 20/18 705/72 |
| 2013/0085887 A1* | 4/2013 | Zhang | G06Q 40/00 705/26.8 |
| 2013/0226803 A1* | 8/2013 | Hsu | G06Q 20/351 705/44 |
| 2014/0081733 A1* | 3/2014 | Morris | G06Q 20/405 705/14.26 |
| 2014/0162598 A1* | 6/2014 | Villa-Real | G06Q 20/32 455/411 |
| 2015/0081546 A1* | 3/2015 | Chauhan | G06Q 20/4097 705/44 |
| 2017/0109752 A1* | 4/2017 | Hubbard | G06Q 20/4014 |
| 2018/0189878 A1* | 7/2018 | Uhr | G06Q 40/04 |

\* cited by examiner

METHOD AND SYSTEM FOR SECURED MERCHANT VERIFICATION

FIELD

The present disclosure relates to the verification of an identity of a transacting entity, specifically the use of processed transactions and multiple refunds to verify a merchant identity via access to both an associated transaction processing system and a financial transaction account.

BACKGROUND

Merchants often have access to a vast number of products and services that are uniquely available to them due to their position. For instance, as merchants often interact with a vast number of consumers on a daily basis, merchants may be offered products regarding identification of information about their consumers, market information in their industry and/or geographic area, and services for reaching or enticing more consumers. In some cases, products or services that may be offered to a merchant may include or utilize sensitive data that may be misused if distributed to someone other than the merchant. For example, data that utilizes information regarding a merchant's clientele and income may be detrimental to that merchant if distributed to a competitor.

As a result, many products and services may seek to try and verify the identity of an entity purporting to be a specific merchant. Traditionally, service providers often employ personnel that can work directly with an employee or owner of a merchant to verify that merchant's identity, such as by asking questions that only that merchant or an authorized individual associated therewith should know, requesting proof of address, etc. However, such systems can be time consuming and labor intensive, and may also only provide evidence that the individual purporting to be associated with the merchant has sufficient knowledge of that merchant; not that they are authorized on behalf of the actual merchant. Such systems often rely on subjective human judgment rather than objective facts, and can be difficult to implement on a large scale allowing for thousands or tens of thousands of authorizations in a given time period. There are a number of technical challenges to such systems, both as to consistency, accuracy and an inability to scale.

Thus, there is a need for a technical solution where an entity may be verified through technological processes to provide certainty as to the entity's identity via their control of data and information directly associated with that entity that cannot be faked without compromise of the entity as a whole. Though not essential, such a system could be more accurate, consistent and/or scalable by taking a different, technology-based approach.

SUMMARY

The present disclosure provides a description of systems and methods for verifying a transacting entity. The identity of a transacting entity is verified via at least two separate avenues: control of a point of sale system used for transaction processing that is associated with the entity, and access to a transaction account associated with the entity. The use of both avenues ensures that a nefarious party cannot pose as the entity without control of both the physical point of sale system of the entity and their transaction account. As a result, the identity of an entity can be accurately verified in a manner that is convenient for the entity, does not require the use of actual personnel to perform the verification, and in a manner that cannot be easily faked.

A method for verifying a transacting entity includes: receiving, by a receiving device of a processing server, a verification request from a first computing system, wherein the verification request includes at least an entity identifier; electronically transmitting, by a transmitting device of the processing server, at least a transaction amount; receiving, by the receiving device of the processing server, a transaction message for a payment transaction via a payment network, wherein the transaction message is formatted based on one or more standards and includes at least a plurality of data elements including at least a first data element configured to store a controlled payment number, a second data element configured to store the transaction amount, and a third data element configured to store the entity identifier; electronically transmitting, by the transmitting device of the processing server, at least two refund messages via the payment network, wherein each of the refund messages is formatted based on the one or more standards and includes at least a plurality of data elements including at least a first data element configured to store the controlled payment number and a second data element configured to store a refund amount, where a total of the refund amount included in each of the at least two refund messages equals the transaction amount; receiving, by the receiving device of the processing server, a verification message, wherein the verification message includes at least the entity identifier and two or more return amounts; and verifying, by a verification module of the processing server, that the two or more return amounts correspond to the refund amounts included in the two or more refund messages.

A system for verifying a transacting entity includes: a verification module of a processing server; a receiving device of the processing server configured to receive a verification request from a first computing system, wherein the verification request includes at least an entity identifier; and a transmitting device of the processing server configured to electronically transmit at least a transaction amount, wherein the receiving device of the processing server is further configured to receive a transaction message for a payment transaction via a payment network, wherein the transaction message is formatted based on one or more standards and includes at least a plurality of data elements including at least a first data element configured to store a controlled payment number, a second data element configured to store the transaction amount, and a third data element configured to store the entity identifier, the transmitting device of the processing server is further configured to electronically transmit at least two refund messages via the payment network, wherein each of the refund messages is formatted based on the one or more standards and includes at least a plurality of data elements including at least a first data element configured to store the controlled payment number and a second data element configured to store a refund amount, where a total of the refund amount included in each of the at least two refund messages equals the transaction amount, the receiving device of the processing server is further configured to receive a verification message, wherein the verification message includes at least the entity identifier and two or more return amounts, and the verification module of the processing server is configured to verify that the two or more return amounts correspond to the refund amounts included in the two or more refund messages.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Point of Sale—A computing device or computing system configured to receive interaction with a user (e.g., a consumer, employee, etc.) for entering in transaction data, payment data, and/or other suitable types of data for the purchase of and/or payment for goods and/or services. The point of sale may be a physical device (e.g., a cash register, kiosk, desktop computer, smart phone, tablet computer, etc.) in a physical location that a customer visits as part of the transaction, such as in a "brick and mortar" store, or may be virtual in e-commerce environments, such as online retailers receiving communications from customers over a network such as the Internet. In instances where the point of sale may be virtual, the computing device operated by the user to initiate the transaction or the computing system that receives data as a result of the transaction may be considered the point of sale, as applicable.

Controlled Payment Number—Controlled payment numbers may be payment numbers associated with a payment account that are subject to one or more rules. In many cases, these rules may be set by a cardholder, such as spending limits, limits on days and/or times of a transaction, limits on merchants or industries, transaction spending or frequency limits, etc. Controlled payment numbers may offer an account holder an opportunity to give payment cards tied to the account to others for use, but subject to rules set by the cardholder, such as an employer distributing cards to employees, or a parent distributing cards to children. Additional detail regarding controlled payment numbers may be found in U.S. Pat. No. 6,636,833, issued Oct. 21, 2003; U.S. Pat. No. 7,136,835, issued Nov. 14, 2006; U.S. Pat. No. 7,571,142, issued Aug. 4, 2009; U.S. Pat. No. 7,567,934, issued Jul. 28, 2009; U.S. Pat. No. 7,593,896, issued Sep. 22, 2009; U.S. Pat. No. 7,359,880, issued Apr. 15, 2008; U.S. Pat. No. 7,895,122, issued Feb. 22, 2011; U.S. Pat. No. 8,229,854, issued Jul. 27, 2012; U.S. Pat. No. 8,321,315, issued Nov. 27, 2012; U.S. Pat. No. 8,510,218, issued Aug. 13, 2013; U.S. Pat. No. 8,639,623, issued Dec. 27, 2012; U.S. Pat. No. 8,756,150, issued Jun. 17, 2014; U.S. Pat. No. 8,527,416, issued Sep. 3, 2013, for example.

System for Verification of the Identity of a Transacting Entity

Figure 1:
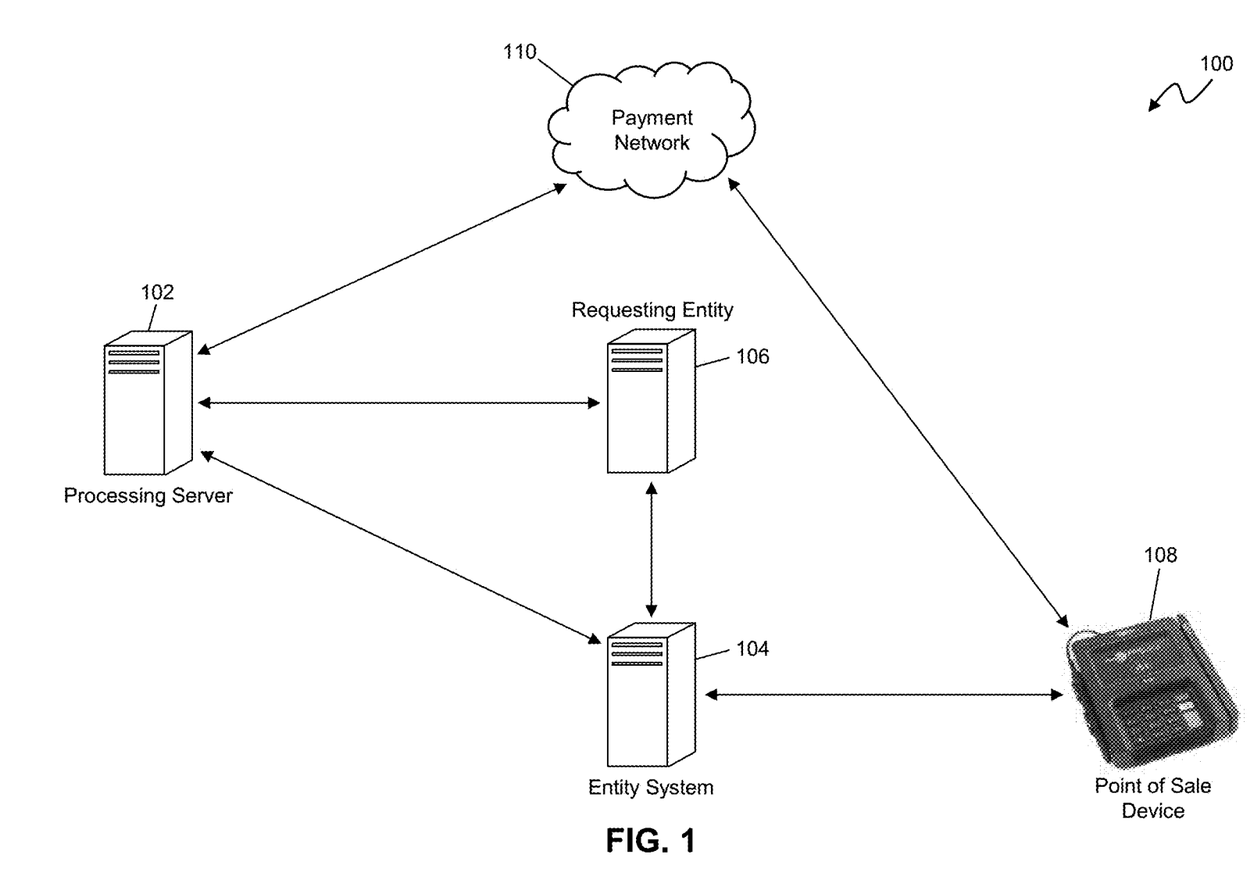
FIG. 1 is a block diagram illustrating a high level system architecture for verifying the identity of a transacting entity in accordance with exemplary embodiments.

FIG. 1 illustrates a system 100 for the verification of the identity of a transacting entity through control of an associated transaction processing system and transaction account.

The system 100 may include a processing server 102. The processing server 102, discussed in more detail below, may be configured to verify the identity of an entity, such as a merchant, via access of the entity to a point of sale system and a transaction account both associated with the entity. The processing server 102 may be a specialized computing system that is specifically configured to perform the functions discussed herein. In the system 100, the processing server 102 may be configured to verify the identity of an entity associated with an entity system 104, such as a merchant that is configured to engage in electronic payment transactions for the sale of goods or services to other entities.

The processing server 102 may receive an entity verification request from a requesting entity 106. The requesting entity 106 may be a secondary entity, such as a service provider, that has an interest in verifying the identity of the merchant associated with the entity system 104. For example, the requesting entity 106 may have a product for purchase by the merchant, and may request verification that the merchant is who they purport to be before distributing sensitive data on that merchant to the entity system 104. In some cases, the entity verification request may be submitted to the processing server 102 directly from an entity system 104, such as when the associated entity wants to verify its identity for the processing server 102 directly (e.g., if the processing server 102 has goods or services to offer the entity that requires verification of the entity's identity). Entity verification requests may be submitted to the processing server 102 using any suitable communication network and method, such as via an application programming interface, web page, application program, etc., which may submit data via the Internet, a cellular communication network, etc.

The processing server 102 may receive an entity verification request from the requesting entity 106 or entity system 104, which may include at least an entity identifier associated with the entity to be verified. The entity identifier may be a unique value associated with the entity that is used in electronic payment transactions involving the entity for identification thereof. For example, the entity identifier may be a merchant identification number, serial number, registration number, etc. In some instances, the entity verification request may also include additional identification information. For example, the entity being verified may be a specific geographic location or a larger merchant (e.g., one branch of a merchant chain). In such an example, the entity verification request may include data associated with the specific geographic location, such as a point of sale identifier associated with a point of sale device 108 at the geographic location, the geographic location (e.g., zip code, postal code, city, global positioning system coordinate, etc.)

The processing server 102 may receive the entity verification request and may identity a controlled payment number for use by the entity being verified. The controlled payment number may be mapped to a transaction account issued to or otherwise accessible by the processing server 102 and may be limited to a specific transaction amount. The specific transaction amount may be identified by the processing server 102 and may be a random or pseudo-random amount. For instance, the processing server 102 may generate a controlled payment number that is subject to a transaction control limiting the controlled payment number to a single payment transaction having a transaction amount of $1.12.

The processing server 102 may then electronically transmit the controlled payment number and specific transaction amount to the entity to be verified, such as by electronically transmitting the controlled payment number and transaction amount to the entity system 104 via a suitable communication network and method. In instances where the entity verification request is submitted directly by the entity system 104, the controlled payment number and specific transaction amount may be provided in response to the entity verification request. In instances where the entity verification request is submitted by the requesting entity 106, the entity verification request may include communication details for contacting the entity system 104, or the processing server 102 may be configured to identify the entity system 104 for receipt of the controlled payment number and specific transaction amount via the entity identifier. In some instances, the processing server 102 may electronically transmit the specific transaction amount to the entity system 104, and may instruct a separate computing system to identify and supply the controlled payment number to the entity system 104.

The entity system 104 may receive the controlled payment number and specific transaction amount and may initiate an electronic payment transaction for the specific transaction amount that is funded via the controlled payment number. The entity system 104 may enter the data into a point of sale device 108 associated therewith and initiate the electronic payment transaction using suitable methods. In instances where the entity verification request may include a device identifier and/or geographic location, the entity system 104 may be required to use a point of sale device 108 associated with the device identifier and/or in the specified geographic location.

As part of the initiation of the payment transaction, a transaction message for the payment transaction may be submitted to a payment network 110 for processing. The transaction message may be submitted directly from the point of sale device 108 (e.g., and/or entity system 104 connected therewith) to the payment network 110, or may be submitted via one or more intermediate entities or systems, such as an acquiring financial institution. The transaction message may be a specially formatted data message formatted pursuant to one or more standards governing the exchange of financial transaction messages, such as the International Organization of Standardization's ISO 8583 or ISO 20022 standards. The transaction message may include a plurality of data elements configured to store transaction data for the electronic payment transaction, including data elements configured to store at least the controlled payment number, the specific transaction amount, and the entity identifier. In some cases, the transaction message may also include data elements configured to store the device identifier associated with the point of sale device 108 used to initiate the payment transaction and/or a geographic location where the point of sale device 108 is located.

The transaction message may be submitted to the payment network 110 via payment rails associated therewith. The payment network 110 may be configured to process the electronic payment transaction using traditional methods and systems. As part of the processing of the electronic payment transaction, the payment network 110 may forward the transaction message or data associated therewith to the processing server 102. In some embodiments, the processing server 102 may be a part of the payment network 110 and may receive the transaction message via internal communication methods of the payment network 110. In other embodiments, the processing server 102 may receive the transaction message via the payment rails associated with the payment network 110.

The processing server 102 may verify that the electronic payment transaction conforms with the data provided to the entity system 104. Specifically, the processing server 102 may verify that the primary account number included in the transaction message is the controlled payment number provided to the entity system 104, and that the transaction amount included in the transaction message is the specific transaction amount provided to the entity system 104. Verification of the data included in the transaction message may ensure that the entity being verified has control of the transaction processing system, specifically the point of sale device 108, associated with the entity.

Upon successful verification of the transaction, the processing server 102 may issue at least two separate refunds for the payment transaction. The processing server 102 may issue refunds via the electronic transmission of refund messages for the payment transaction to the payment network 110 for processing thereby. The processing server 102 may issue at least two separate refunds for refund amounts, wherein the total of the refund amounts is equivalent to the specific transaction amount, such that the specific transaction amount is entirely refunded via the refunds. In some embodiments, each of the refund amounts may be different, such that no two refunds for the electronic payment transaction include the same refund amount.

The refunds may be processed by the payment network 110 such that the refund amounts are refunded to the transaction account associated with the entity that was used in the initial electronic payment transaction. The entity may review their account information using a suitable method (e.g., via an issued account statement, an application program associated with their issuing bank, a web page of their issuing bank, etc.) to identify each of the refund amounts for the issued refunds. The entity may then electronically transmit the refund amounts to the processing server 102.

The processing server 102 may verify that the amounts submitted by the entity are equivalent to the refund amounts of each of the issued refunds. Verification of the refund amounts may ensure that the entity has access to the transaction account associated with the entity that is used in electronic payment transactions involving the entity. Thus, the processing server 102 will have verified that the entity controls both the transaction processing system associated with the entity as well as the transaction account associated with the entity for verification of the identity thereof. In some embodiments, the processing server 102 may issue a random or pseudo-random number of refunds to refund the payment transaction, where the number may not be provided to the entity system 104. In such embodiments, the entity will have to identify both the refund amounts and the number or refunds to verify their access to the transaction account associated with the entity.

In some embodiments, the processing server 102 may be configured to use additional identity verification techniques in addition to the verification of access to the transaction processing system and transaction account as discussed herein. In a first example, the processing server 102 may be configured to verify an e-mail address associated with the entity, such as by electronically transmitting an e-mail to the registered e-mail address that includes a predetermined value, which the entity may provide to the processing server 102 via a different communication method (e.g., an application programming interface, web page, telephone call, text message, etc.) to verify the entity's access to the registered e-mail address. In a second example, the processing server 102 may verify the entity's access to a registered telephone number, mailing address, or physical address using similar techniques and methods.

In instances where a requesting entity 106 may request verification of the identity of the transacting entity, the requesting entity 106 may specify the number or types of additional verification techniques that may be used in addition to verifying the transaction processing system and transaction account. In addition, the processing server 102 may be configured to electronically transmit a result of the verification to the requesting entity 106. For instance, the processing server 102 may notify the requesting entity 106 if the transacting entity is successfully or unsuccessfully verified as being the entity purported to be. The requesting entity 106 may then proceed to provide the transacting entity with goods or services, if applicable.

The methods and systems discussed herein enable the identity of a transacting entity to be verified via proof of access of the transacting entity to a transaction processing system and transaction account associated with the entity. The use of verification of both accesses ensures that a nefarious actor cannot pretend to be the transacting entity by taking over a point of sale device 108 or compromised access to the transaction account without having done both, which may present a significantly higher level of security. In addition, the use of automated transaction processing for verification of identity may result in the process being performed with minimal or entirely without human intervention, enabling transacting entities to be verified faster and with less usage of resources. As a result, the methods and systems discussed herein provide for identity verification that is more accurate and efficient than traditional systems.

Processing Server

Figure 2:
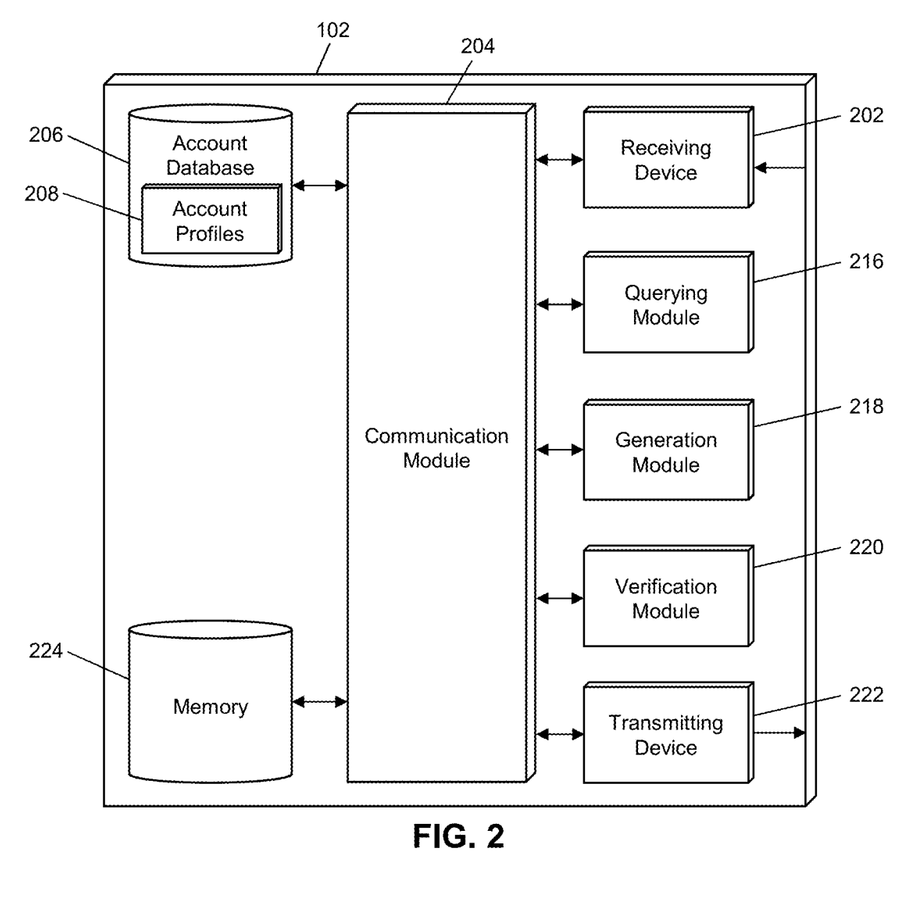
FIG. 2 is a block diagram illustrating the processing server of the system of FIG. 1 for verifying entity identity's in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from entity systems 104, requesting entities 106, payment networks 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by entity systems 104 and requesting entities 106 that are superimposed or otherwise encoded with verification requests, which may include at least entity identifiers and may also include device identifiers, geographic locations, or other identification information. The receiving device 202 may also be configured to receive data signals electronically transmitted by entity systems 104 that are superimposed or otherwise encoded with refund amounts for use in verification of the entity's access to an associated transaction account. The receiving device 202 may also be configured to receive transaction messages electronically transmitted by payment networks 110, which may include transaction data for electronic payment transactions including at least controlled payment numbers, transaction amounts, entity identifiers, and other data for use in performing the functions discussed herein.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 216, generation module 218, verification module 220, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to a transaction account including at least the entity identifier associated with the entity associated with the related transaction account. In some instances, an account profile 208 may also include at least one of: a device identifier, geographic location, communication information, etc.

The processing server 102 may include a querying module 216. The querying module 216 may be configured to execute queries on databases to identify information. The querying module 216 may receive one or more data values or query strings, and may execute a query string based thereon on an indicated database, such as the account database 206, to identify information stored therein. The querying module 216 may then output the identified information to an appropriate engine or module of the processing server 102 as necessary. The querying module 216 may, for example, execute a query on the account database 206 to identify an account profile 208 that includes an entity identifier included in an entity verification request, such as to identify communication details included therein for contacting the entity system 104.

The processing server 102 may also include a generation module 218. The generation module 218 may be configured to generate data for use in performing the functions of the processing server 102 as discussed herein. The generation module 218 may receive an instruction as input, may generate data as instructed, and may output the generated data to another module or engine of the processing server 102. For example, the generation module 218 may be configured to generate or otherwise identify controlled payment numbers for use in verification payment transactions. The generation module 218 may also be configured to generate specific transaction amounts, numbers of refunds, and refund amounts, such as using methods for the generation of random or pseudo-random values. In some embodiments, generation of controlled payment numbers may include the generation of requests for controlled payment numbers that may be submitted to a third party entity configured to generate and process the usage of controlled payment numbers.

The processing server 102 may include a verification module 220. The verification module 220 may be configured to verify data for the processing server 102 as part of the functions discussed herein. The verification module 220 may receive data to be verified as input, may attempt to verify the data, and may output a result of the verification to another module or engine of the processing server 102. The verification module 220 may be configured to verify data included in a received transaction message, such to verify that a primary account number and transaction amount included therein correspond to a controlled payment number and specific transaction amount provided to a transacting entity. The verification module 220 may also be configured to verify refund amounts submitted to the processing server 102 via an entity system 104 as corresponding to refund amounts for refunds issued by the processing server 102 subsequent to an electronic payment transaction.

The processing server 102 may also include a transmitting device 222. The transmitting device 222 may be configured to transmit data over one or more networks via one or more network protocols. In some instances, the transmitting device 222 may be configured to transmit data to entity systems 104, requesting entities 106, payment networks 110, and other entities via one or more communication methods, local area networks, wireless area networks, cellular communication, Bluetooth, radio frequency, the Internet, etc. In some embodiments, the transmitting device 222 may be comprised of multiple devices, such as different transmitting devices for transmitting data over different networks, such as a first transmitting device for transmitting data over a local area network and a second transmitting device for transmitting data via the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals to entity systems 106, which may be superimposed or otherwise encoded with controlled payment numbers and specific transaction amounts for use in verification payment transactions. The transmitting device 222 may also be configured to electronically transmit data signals to entity systems 104 and requesting entities 106 that are superimposed or otherwise encoded with entity verification results, such as provided by the verification module 220 regarding verification of entity access to transaction processing systems and transaction accounts. The transmitting device 222 may also be configured to electronically transmit transaction messages to payment networks 110 via payment rails associated therewith, which may be refund messages for the issuing of refunds for an electronic payment transaction.

The processing server 102 may also include a memory 224. The memory 224 may be configured to store data for use by the processing server 102 in performing the functions discussed herein, such as public and private keys, symmetric keys, etc. The memory 224 may be configured to store data using suitable data formatting methods and schema and may be any suitable type of memory, such as read-only memory, random access memory, etc. The memory 224 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 224 may be comprised of or may otherwise include a relational database that utilizes structured query language for the storage, identification, modifying, updating, accessing, etc. of structured data sets stored therein.

Process for Verifying the Identity of a Transacting Entity

Figure 3:
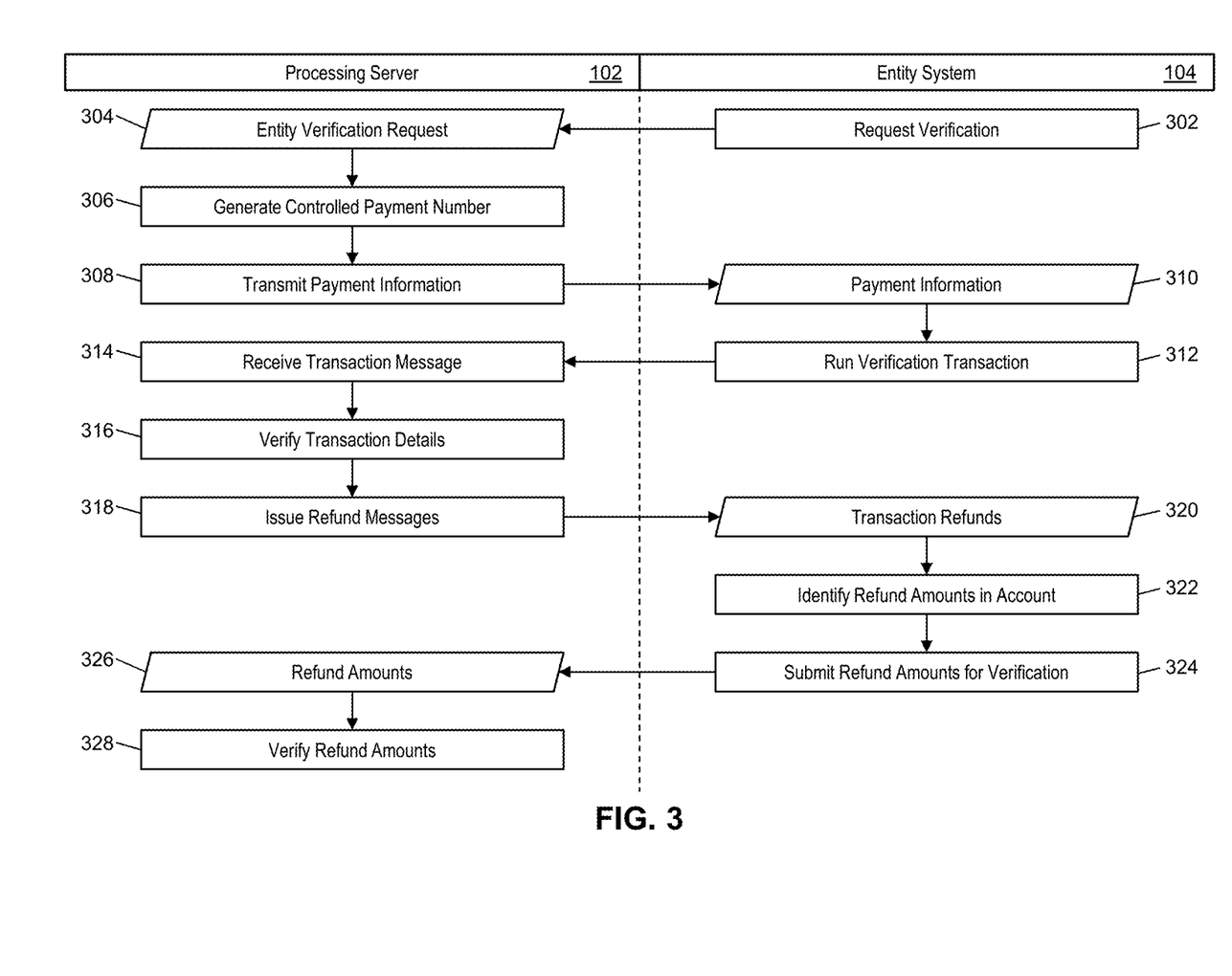
FIG. 3 is a flow diagram illustrating a process for verifying the identity of a transacting entity in the system of FIG. 1 in accordance with exemplary embodiments.

FIG. 3 illustrates a process for the verification of the identity of an entity engaged in electronic payment transactions in the system 100 via verification of access of the entity to transaction processing systems and transaction accounts associated therewith.

In step 302, the entity system 104 may electronically transmit an entity verification request to the processing server 102 using a suitable communication network and method, such as submission of the entity verification request via an application programming interface associated with the processing server 102. In step 304, the receiving device 202 of the processing server 102 may receive the entity verification request. The entity verification request may include at least an entity identifier associated with the entity that the entity system 104 is purporting to be. In some instances, the entity verification request may also include a geographic location and/or device identifier associated with a point of sale device 108 associated with the entity.

In step 306, the generation module 218 may generate a controlled payment number and a specific transaction amount, wherein the controlled payment number is subject to a transaction control limiting spending to the specific transaction amount. In some embodiments, the controlled payment number may also be limited for use in a single electronic payment transaction. In step 308, the transmitting device 222 of the processing server 102 may electronically transmit the controlled payment number and specific transaction amount to the entity system 104 via a suitable communication network and method. In step 310, the entity system 104 may receive the payment information.

In step 312, the entity system 104 may initiate an electronic payment transaction using a point of sale device 108 associated therewith for the specific transaction amount that includes the controlled payment number as the primary account number used to fund the payment transaction. The electronic payment transaction may be submitted to a payment network 110 for processing. In step 314, the receiving device 202 of the processing server 102 may receive a transaction message for the electronic payment transaction from the payment network 110 via payment rails associated therewith. In step 316, the verification module 220 of the processing server 102 may verify that the data included in the transaction message corresponds to the generated payment information and, if applicable, data included in the entity verification request and/or an account profile 208 associated therewith. For instance, the verification module 220 may verify that the primary account number and transaction amount included in the transaction message corresponds to the generated controlled payment number and specific transaction amount, and may verify that an device identifier and/or geographic location corresponds to an entity identifier or geographic location, respectively, which may be included in the entity verification request or in an account profile 208 stored in the account database 206 that includes the entity identifier.

Upon successful verification of the transaction details, in step 318, the transmitting device 222 of the processing server 102 may issue at least two refund messages to the payment network via the payment rails associated therewith for refunding of the electronic payment transaction, wherein the total of the refunds may be equivalent to the specific transaction amount. In some cases, the number of refund messages and the refund amounts for each may be generated by the generation module 218. In some embodiments, the refund amount of each refund message may be a different amount. In step 320, the entity system 104 may receive the refunds following processing thereof by the payment network 110 using traditional methods and systems.

In step 322, the entity system 104 may identify the number of refunds and corresponding refund amounts in their transaction account using a suitable method for identification thereof, such as by reviewing an account statement for their transaction account via a web page or application program associated with the financial institution associated therewith. In step 324, the entity system 104 may submit the refund amounts for each of the refunds to the processing server 102 using a suitable communication network and method. In step 326, the receiving device 202 of the processing server 102 may receive the fund amounts. In step 328, the verification module 220 of the processing server 102 may verify that each of the refund amounts submitted by the entity system 104 corresponds to the refund amounts in the refunds issued in step 318. Positive verification of the refund amounts in step 328 may result in positive verification of the entity as being the entity purported to be as associated with the entity identifier submitted in the entity verification request.

Exemplary Method for Verifying a Transacting Entity

Figure 4:
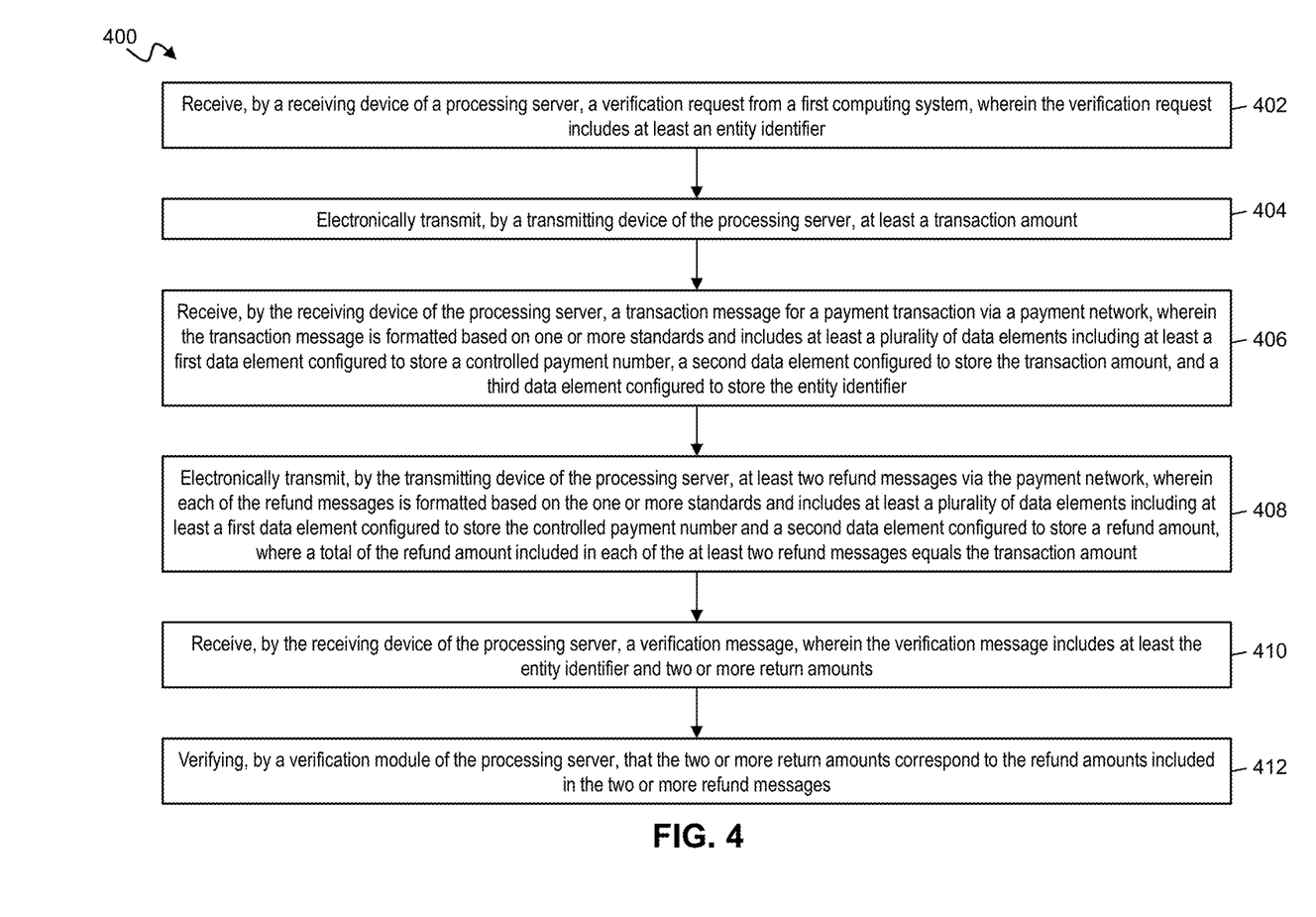
FIG. 4 is a flow chart illustrating an exemplary method for verifying a transacting entity in accordance with exemplary embodiments.

FIG. 4 illustrates a method 400 for the verification of the identity of a transacting entity through the conducting of electronic payment transactions and refunding thereof.

In step 402, a verification request may be received by a receiving device (e.g., the receiving device 202) of a processing server (e.g., the processing server 102) from a first computing system (e.g., the entity system 104 or requesting entity 106), wherein the verification request includes at least an entity identifier. In step 404, at least a transaction amount may be electronically transmitted by a transmitting device (e.g., the transmitting device 222) of the processing server.

In step 406, a transaction message for a payment transaction may be received by the receiving device of the processing server via a payment network (e.g., the payment network 110), wherein the transaction message is formatted based on one or more standards and includes at least a plurality of data elements including at least a first data element configured to store a controlled payment number, a second data element configured to store the transaction amount, and a third data element configured to store the entity identifier. In step 408, a least two refund messages may be electronically transmitted by the transmitting device of the processing server via the payment network, wherein each of the refund messages is formatted based on the one or more standards and includes at least a plurality of data elements including at least a first data element configured to store the controlled payment number and a second data element configured to store a refund amount, where a total of the refund amount included in each of the at least two refund messages equals the transaction amount.

In step 410, a verification message may be received by the receiving device of the processing server, wherein the verification message includes at least the entity identifier and two or more return amounts. In step 412, a verification module (e.g., the verification module 220) of the processing server may verify that the two or more return amounts correspond to the refund amounts included in the two or more refund messages.

In one embodiment, the transaction amount may be electronically transmitted to the first computing system. In some embodiments, the transaction amount may be electronically transmitted to a second computing system. In a further embodiment, the method 400 may further include electronically transmitting, by the transmitting device of the processing server, a result of the verification to the first computing system. In one embodiment, the verification request may further include communication data, and the controlled payment number and transaction amount may be electronically transmitted to a second computing system using the communication data.

In some embodiments, verification may yield a negative result if a number of the two or more return amounts does not equal a number of the two or more refund messages. In one embodiment, each of the two or more refund messages may include a different refund amount. In some embodiments, the method 400 may also include storing, in an account database (e.g., the account database 206) of the processing server, an account profile (e.g., account profile 208), wherein the account profile includes a structured data set related to an entity (e.g., the entity system 104) including at least the entity identifier and a geographic location, wherein the transaction message further includes a fourth data element configured to store the geographic location.

Computer System Architecture

Figure 5:
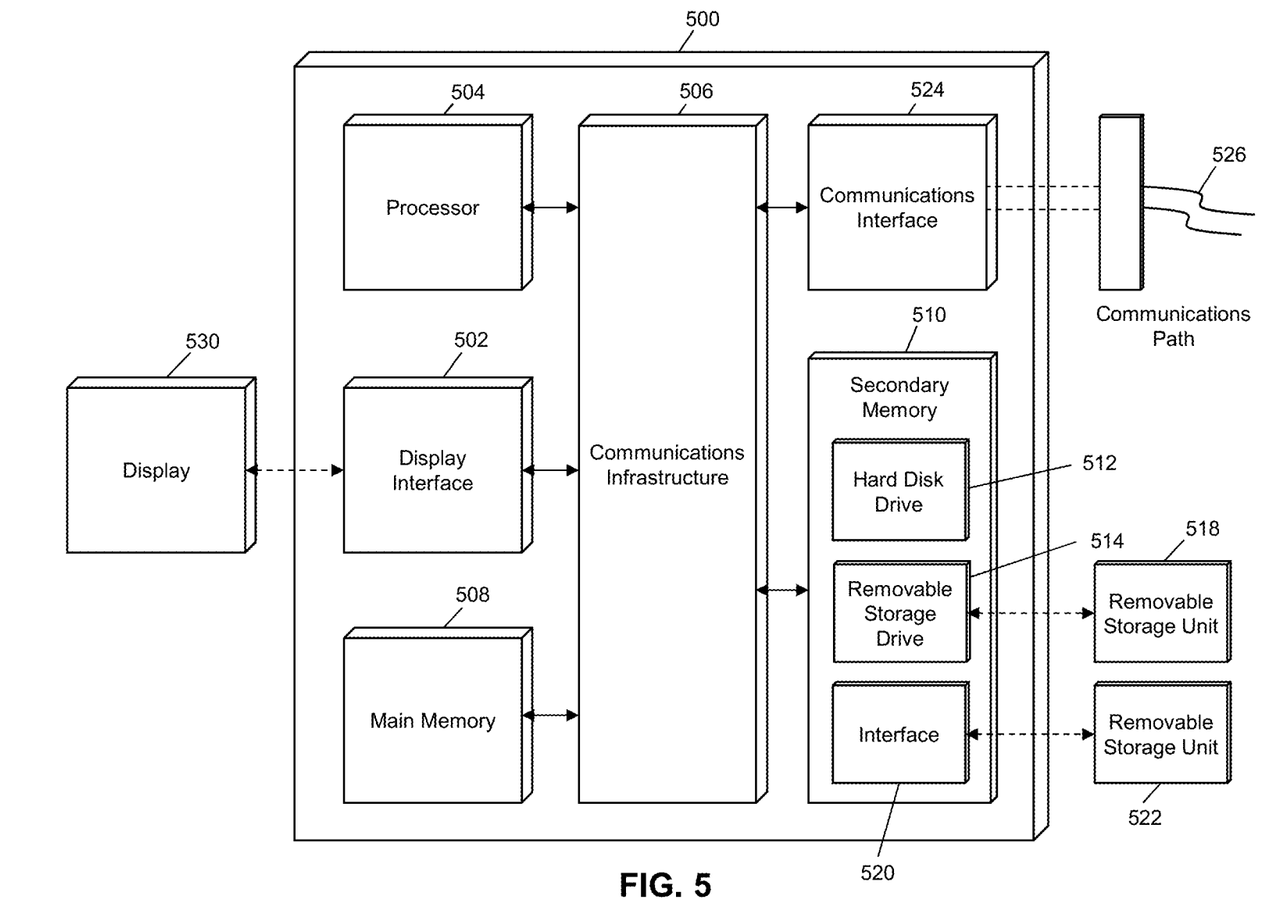
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for verifying a transacting entity. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for two-stage verification of a transacting entity through control of a transaction and a transaction account via a processed transaction and a plurality of refunds, comprising:

receiving, by a receiving device of a processing server, a verification request from a first computing system, wherein the verification request includes at least an entity identifier;

electronically transmitting, by a transmitting device of the processing server, at least a transaction amount;

receiving, by the receiving device of the processing server, a transaction message for a payment transaction via a payment network, wherein the transaction message is formatted based on one or more standards and includes at least a plurality of data elements including at least a first data element configured to store a controlled payment number, wherein a controlled payment number is associated with a payment account and subject to one or more rules, a second data element configured to store the transaction amount, and a third data element configured to store the entity identifier;

electronically transmitting, by the transmitting device of the processing server, at least two refund messages via the payment network, wherein each of the refund messages is formatted based on the one or more standards and includes at least a plurality of data elements including at least a first data element configured to store the controlled payment number and a second data element configured to store a refund amount, where a total of the refund amount included in each of the at least two refund messages equals the transaction amount such that the transaction amount is entirely refunded;

receiving, by the receiving device of the processing server, a verification message, wherein the verification message includes at least the entity identifier and two or more return amounts; and verifying, by a verification module of the processing server, a transacting entity via verifying that the two or more return amounts correspond to the refund amounts included in the two or more refund messages.

2. The method of claim 1, wherein the transaction amount is electronically transmitted to the first computing system.

3. The method of claim 1, wherein the transaction amount is electronically transmitted to a second computing system.

4. The method of claim 3, further comprising:
electronically transmitting, by the transmitting device of the processing server, a result of the verification to the first computing system.

5. The method of claim 1, wherein
the verification request further includes communication data, and
the transaction amount is electronically transmitted to a second computing system using the communication data.

6. The method of claim 1, wherein verification yields a negative result if a number of the two or more return amounts does not equal a number of the two or more refund messages.

7. The method of claim 1, wherein each of the two or more refund messages includes a different refund amount.

8. The method of claim 1, further comprising:
storing, in an account database of the processing server, an account profile, wherein the account profile includes a structured data set related to an entity including at least the entity identifier and a geographic location, wherein
the transaction message further includes a fourth data element configured to store the geographic location.

9. A system for two-stage verification of a transacting entity through control of a transaction and a transaction account via a processed transaction and a plurality of refunds, comprising:

a verification module of a processing server;

a receiving device of the processing server configured to receive a verification request from a first computing system, wherein the verification request includes at least an entity identifier; and a transmitting device of the processing server configured to electronically transmit at least a transaction amount, wherein the receiving device of the processing server is further configured to receive a transaction message for a payment transaction via a payment network, wherein the transaction message is formatted based on one or more standards and includes at least a plurality of data elements including at least a first data element configured to store a controlled payment number, wherein a controlled payment number is associated with a payment account and subject to one or more rules, a second data element configured to store the transaction amount, and a third data element configured to store the entity identifier, the transmitting device of the processing server is further configured to electronically transmit at least two refund messages via the payment network, wherein each of the refund messages is formatted based on the one or more standards and includes at least a plurality of data elements including at least a first data element configured to store the controlled payment number and a second data element configured to store a refund amount, where a total of the refund amount included in each of the at least two refund messages equals the transaction amount such that the transaction amount is entirely refunded, the receiving device of the processing server is further configured to receive a verification message, wherein the verification message includes at least the entity identifier and two or more return amounts, and the verification module of the processing server is configured to verify a transacting entity via verifying that the two or more return amounts correspond to the refund amounts included in the two or more refund messages.

10. The system of claim 9, wherein the transaction amount is electronically transmitted to the first computing system.

11. The system of claim 9, wherein the transaction amount is electronically transmitted to a second computing system.

12. The system of claim 11, wherein the transmitting device of the processing server is further configured to electronically transmit a result of the verification to the first computing system.

13. The system of claim 9, wherein
the verification request further includes communication data, and
the transaction amount is electronically transmitted to a second computing system using the communication data.

14. The system of claim 9, wherein verification yields a negative result if a number of the two or more return amounts does not equal a number of the two or more refund messages.

15. The system of claim 9, wherein each of the two or more refund messages includes a different refund amount.

16. The system of claim 9, further comprising:
an account database of the processing server configured to store an account profile, wherein the account profile includes a structured data set related to an entity including at least the entity identifier and a geographic location, wherein
the transaction message further includes a fourth data element configured to store the geographic location.

* * * * *